United States Patent [19]
Abe et al.

[11] Patent Number: 5,760,988
[45] Date of Patent: Jun. 2, 1998

[54] TRACKING METHOD AND APPARATUS USED IN HELICAL SCAN MAGNETIC RECORDING/REPRODUCING SYSTEM

[75] Inventors: Hiroya Abe, Hiratsuka; Hideo Nishijima, Katsuta; Kouji Kaniwa, Yokohama; Kouji Minabe; Yoshio Narita, both of Katsuta, all of Japan

[73] Assignee: Hitachi, Ltd., Tokyo, Japan

[21] Appl. No.: 322,423

[22] Filed: Oct. 13, 1994

[30] Foreign Application Priority Data

Oct. 18, 1993 [JP] Japan ............... 5-259821

[51] Int. Cl.$^6$ .................... G11B 15/52; G11B 5/596
[52] U.S. Cl. .................... 360/73.11; 360/77.04
[58] Field of Search .................... 360/73.05, 73.11, 360/77.04, 73.04

[56] References Cited

U.S. PATENT DOCUMENTS

| | | |
|---|---|---|
| 4,613,914 | 9/1986 | Kobori et al. |
| 4,618,899 | 10/1986 | Doutsubo ............ 360/73.05 X |
| 4,647,990 | 3/1987 | Sasamura ............ 360/70 |
| 4,777,543 | 10/1988 | Nishijima et al. |
| 5,270,873 | 12/1993 | Sakai et al. ............ 360/73.11 X |

FOREIGN PATENT DOCUMENTS

| | | |
|---|---|---|
| 55-12563 | 1/1980 | Japan. |
| 58-1843 | 1/1983 | Japan. |
| 2-312048 | 12/1990 | Japan. |

*Primary Examiner*—Aristotelis M. Psitos
*Assistant Examiner*—Regina Y. Neal
*Attorney, Agent, or Firm*—Antonelli, Terry, Stout, & Kraus, LLP

[57] ABSTRACT

A tracking method and apparatus used in a helical scan magnetic recording/reproducing system is based on an automatic tracking control using an envelope detection signal of a reproduced signal. The tracking apparatus is provided with a circuit for controlling the rotation speed of a capstan motor which transports a magnetic tape, a level comparing circuit for making the comparison for the level of an envelope signal of the reproduced signal, a circuit for applying a predetermined deviation to the rotation speed in accordance with the result of comparison, a circuit for detecting a steady speed deviation between a recording apparatus and a reproducing apparatus from a speed deviation signal generated in the process of the automatic tracking control, and a circuit for correcting the speed deviation.

2 Claims, 9 Drawing Sheets

5,760,988

TRACKING METHOD AND APPARATUS USED IN HELICAL SCAN MAGNETIC RECORDING/REPRODUCING SYSTEM

BACKGROUND OF THE INVENTION

The present invention relates to a tracking method and apparatus used in a helical scan magnetic recording/reproducing system, and more particularly to such a tracking method and apparatus using an envelope detection signal of a reproduction signal.

In a helical scan magnetic recording/reproducing system, a tracking control is performed such that at the time of reproduction, a magnetic head traces recording tracks obliquely formed on a magnetic tape. This tracking control will now be explained with reference to FIG. 9.

In FIG. 9, reference numeral 52 denotes a magnetic tape which is transported at a speed Vt in a direction indicated by the arrow. Recording tracks j–2 to j+2 are recorded for each field in the order of j–2, j–1, - - - , j+2. Numeral 21 denotes a magnetic head which scans at a speed Vd in a direction indicated by the arrow. Symbols a, b and c represent three different positions of the magnetic head 21 relative to the recording track j in a horizontal direction. The position a represents the case where the magnetic head scans the center of the track, that is, a condition in which the tracking is correct. The position b represents the case where the tracking has a deviation to the succeeding track side, and the position c represents the case where the tracking has a deviation to the preceding track side. In a tracking control, the transport speed of the tape is controlled so that the magnetic head always takes the condition a. If the magnetic head takes the condition b, the magnetic tape is decelerated. If the magnetic head takes the condition c, the magnetic tape is accelerated. Though the control of the transport speed of the tape is made by the control of a rotation speed of a capstan motor, the acceleration/deceleration control is equivalent to the control of a rotation phase which is the integrated value of the rotation speed. Therefore, the following explanation will be made referring to such a control as phase control.

Known tracking systems are categorized into several types of tracking systems with respect to the method for detection of a tracking deviation. A known typical tracking system includes a control signal system (hereinafter referred to as a CTL system) which is employed in a VHS system or the like, and an ATF system which uses a pilot signal and is employed in an 8 mm VTR or the like. In the CTL system, a tracking control is performed by controlling the transport speed of a magnetic tape so that a control signal (or CTL signal) recorded at a frame period in a longitudinal direction of the tape and the phase of rotation of a cylinder on which a magnetic head is mounted have a predetermined phase relation therebetween. Also, in an example of the ATF system, for example, in an 8 mm VTR, four kinds of pilot signals having different frequencies are cyclically recorded for successive fields at the time of recording and a tracking control at the time of reproduction is performed by detecting the recorded pilot signals to control the transport speed of a tape so that the levels of pilot signals reproduced from two tracks on opposite sides of a main track to be scanned become equal to each other.

Though each of the CTL system and the ATF system uses a signal for tracking control, there is also known a tracking control system in which no dedicated signal for tracking is used and the level of a reproduced video signal is detected to control a tape speed so that the detected level becomes a maximum. For example, JP-A-58-1843 has disclosed a tracking apparatus of a CTL system in which means for delaying a reproduced CTL signal to shift a tracking phase and means for making a comparison in level of the envelope detection output of a reproduced video signal are provided for performing a so-called "mountain climbing method" (or automatic tracking control). In the automatic tracking control, the increase of the envelope level by the shift of the tracking phase is followed by the application of a phase shift in the same direction and the decrease of the envelope level is followed by the inversion of the direction of phase shift, so that a maximum envelope level is attained. Thereby, a tracking deviation which may be caused by, for example, a deviation in attachment position of a CTL head between a recording apparatus and a reproducing apparatus is corrected.

FIG. 10A schematically shows the operation of the automatic tracking control in which an envelope detection signal is used. When a tracking phase is shifted from a position denoted by "0" in FIG. 10A by Δx in a positive (+) direction, the shift to a position denoted by "1" is made. Thereby, an envelope level increases. Then, the next phase shift is made in the same direction. When the shift is made to a position denoted by "4", the envelope level decreases. Then, the direction of phase shift is inverted so that the shift to a position denoted by "5" is made. Subsequently, the phase shift steps from the position "5" to a position "7" are performed, thereby performing a tracking control so that the envelope level takes a value in the vicinity of a maximum value.

The following publications other than JP-A-58-1843 are relevant to tracking control techniques.

U.S. Pat. No. 4,613,914 has disclosed a technique in which a high-precision tracking is performed with a shortened search time by performing a fine search after first performing a coarse search of one track pitch to obtain a range of tracking phase in which a better tracking condition is provided.

U.S. Pat. No. 4,777,543 has disclosed a technique in which automatic tracking is stabilized by detecting a plurality of points on a reproduced envelope in one period to take a minimum value of those points as a sample value of a tracking condition and controlling a tracking phase so that the sample value becomes a maximum.

JP-A-55-12563 has disclosed a technique in which the phase of a capstan servo is changed to detect a change in envelope level of a reproduced signal before and after the phase change and a control is performed so that the envelope level becomes a maximum.

JP-A-2-312048 has disclosed a technique in which first tracking means for fluctuating the speed of a capstan motor at a predetermined rate to perform synchronous detection and second tracking means for performing a tracking based on a reproduced envelope signal are provided, whereby a tracking control is performed by the first means in a start-up or build-up period of time after a mode transition and is thereafter performed by the second means. This publication has also disclosed correcting a speed offset by integrating a phase error signal produced by the first means.

SUMMARY OF THE INVENTION

The above-mentioned CTL system or ATF system using a dedicated tracking signal requires circuit or mechanical parts. This is an obstacle to the reduction in cost and/or number of parts. Also, since a tracking control system employed in the CTL system or ATF system differs depending on a recording system, parts have no generality or circuit parts adapted to each system are necessary. This is also a an obstacle to the reduction in cost. On the other hand, the system using the envelope signal of a reproduced video signal does not use a special signal for tracking control and therefore has a merit that the number of circuit parts can be reduced and the recording system need not be taken into account.

However, the prior art disclosed by JP-A-58-1843 has a construction primarily based on a tracking control of the CTL system and secondarily based on a tracking control of the envelope detection system. Namely, a basic tracking control is performed on the basis of the CTL system and a fine adjustment is performed on the basis of the envelope detection system. But, if the tracking control is performed by only the envelope detection system without using another tracking control system such as the CTL system in order to reduce the cost, the following problems occur.

(1) Trade-Off between Response Time and Image Quality

Provided that a period of detection of increase/decrease of an envelope level to apply a phase shift (hereinafter referred to as increase/decrease detection period) is T (seconds), the amount of shift per one shift step is $\Delta x$ (tracks) and the amount of tracking deviation at the point of time of start of a tracking control is $\Delta\theta$ (tracks), a time of $T \cdot \Delta\theta/\Delta x$ (seconds) is required until a tracking control is pulled in. This pull-in time may be shortened by making the period T short and the shift amount $\Delta x$ large.

In the automatic tracking control, on the other hand, since the phase is always shifted, the pattern of the trace of the head meanders around the maximum point of an envelope signal. The width of meandering is proportional to the shift amount $\Delta x$. If the shift amount $\Delta x$ or the width of meandering is made large in order to shorten the above-mentioned pull-in time (or transient response time), this causes the deterioration of a jitter performance at the period of meandering or the deterioration of a reproduced signal resulting from the meandering and the deterioration of image quality and sound quality resulting from the increase of an interfering signal from the adjacent track.

(2) Deterioration of Compatible Reproduction

Though the standard of tape transport speed is defined for each recording system, there is an allowable error on the order of ±0.5%. In the CTL system or ATF system, a control signal is generated in accordance with the amount of tracking error to perform a feedback control, thereby making it possible to absorb a speed error in a range in which the allowable speed error can be covered sufficiently. In the case of the automatic tracking control, however, since a fixed phase shift is applied, it is difficult to widen a tracking pull-in range. For example, if $\Delta Tr > \Delta v$ wherein $\Delta Tr (=\Delta x/T)$ is the amount of change in tracking per one unit time when the phase shift is applied and $\Delta v$ is the amount of change in tracking per one unit time caused by an offset in tape transport speed between a recording apparatus and a reproducing apparatus, it is possible to correctly detect a change in an envelope level resulting from the phase shift, thereby effecting the tracking control. In the case of $\Delta Tr < \Delta v$, however, no tracking is effected since it is not possible to absorb a tracking deviation caused by the speed offset.

This situation is shown in FIG. 10B. Now assume that a phase shift in a positive (+) direction is applied at a position indicated by "0" in FIG. 10B. In this case, however, since $\Delta Tr < \Delta v$ or the amount of tracking change resulting from the phase shift is smaller than the amount of tracking change caused by the speed offset, a position indicated by "1" is reached. Namely, the envelope level decreases notwithstanding that the phase shift has been applied in a direction in which the envelope level is increased. Therefore, the next phase shift is applied in a reverse direction or the direction of phase shift is changed judging the crossing of a peak as having been made in the automatic tracking control. Then, a point "2" is reached. Thus, in the case of $\Delta Tr < \Delta v$, no tracking is effected.

In order to avoid the above inconvenience, it is required that $\Delta Tr$ or the step amount $\Delta x$ should be made large and the offset addition or application period (or envelope level increase/decrease detection period) T should be made small, so that the relation of $\Delta Tr > \Delta v$ is always satisfied. However, if such a measure is taken, this results in the deterioration of jitter performance, image quality and sound quality, as mentioned in the preceding item (1).

An object of the present invention made in light of such circumstances is to solve the above-mentioned problems of the transient response time and tape speed offset (or deviation) between a recording apparatus and a reproducing apparatus through the use of only an automatic tracking control based on an envelope signal with no combined use of another tracking means (or system), thereby providing a tracking method and apparatus for a magnetic recording/reproducing system in which a high-precision tracking control is performed with a simple construction.

In a tracking apparatus according to the present invention, a control circuit of a capstan motor for controlling the transport speed of a tape is provided with the following construction in order to perform a tracking control through the use of only an automatic tracking control based on an envelope signal. Namely, the control circuit includes a speed control system based on the detection of the period of a pulse signal having a frequency proportional to the rotation frequency of the capstan motor and a phase control system based on the comparison of the phase of the pulse signal with the phase of a reference phase signal. At the time of reproduction, an offset is added to the reference phase signal to shift the phase of rotation. Further, there are provided means for detecting the envelope level of a reproduced video signal and envelope level increase/decrease detecting means for comparing envelope levels before and after the application of a phase shift to maintain the direction of application of the phase shift if the envelope level is increased and to invert the direction of application of the phase shift if the envelope level is decreased.

In order to cope with the problem mentioned in the above item (1), one embodiment of the present invention is constructed with means for variably changing parameters including the step amount $\Delta x$, the increase/decrease detection period T, and a control characteristic such as the gain of the phase control system and a control band, and providing a plurality of modes having different parameters, whereby the parameters are successively changed over. The setting of the parameters is such that in a period of time from the start of a tracking control until the tracking pull-in, the step amount $\Delta x$ is made large, the offset addition period (or increase/decrease detection period) T is made short, the gain of the phase control system is made high and the control band is made wide, thereby shortening the tracking pull-in time. On the other hand, after the completion of pull-in, the step amount $\Delta x$ is made small, the offset addition period T is made long, and the gain of the phase control system and the control band are made equivalent to those at the time of recording, thereby making the width of meandering of a head trace pattern narrow.

In order to cope with the problem mentioned in the above item (2), another embodiment of the present invention is constructed with means for integrating phase offset data generated in a tracking control in a predetermined period of time to detect the presence/absence of a speed offset and the polarity of the speed offset by use of a deviation of the value of integration from 0, and means for adding a speed offset correction signal for correction of the speed offset to a reference phase signal. Further, detection parameters are optimized through successive change-overs, thereby shortening the time of convergence of the speed offset correction.

In a certain embodiment of the present invention, the same speed control system and phase control system are used both at the time of recording and at the time of reproduction.

The phase control system at the time of recording has a function of absorbing a steady speed deviation generated in the speed control system to rotate a capstan motor at a predetermined frequency. At the time of reproduction, the same control system is used for transporting the tape at a predetermined speed and for obtaining tracking information through an automatic tracking control using an envelope signal, thereby performing a tracking control. Thus, the tracking control can be realized without the use of another tracking means.

With the provision of the plurality of modes and the optimization of parameters in accordance with the situation of tracking, it is possible to make a transient response time and a steady characteristic consistent with each other. Namely, it is possible to have the response time take preference over the image quality in the case where the tracking deviation is large and to change over to a control giving preference to the image quality after pull-in. Also, in the conventional CTL system or ATF system, a phase control system at the time of recording is different from that at the time of reproduction and this difference has resulted in the deterioration of a jitter performance. In the present invention, however, since the rotation of the motor is controlled by the fundamentally same control system both at the time of recording and at the time of reproduction, a motor control characteristic at the time of recording and that at the time of reproduction become equal to each other if the amount of phase shift in a steady mode is made sufficiently small. Thereby, the jitter performance can be improved in comparison with that in the conventional tracking system.

With the provision of the means for correcting the speed offset (or deviation) between the recording apparatus and the reproducing apparatus, it is possible to make the step amount $\Delta x$ small and the offset addition period T long, thereby avoiding the deterioration of image quality in a steady state. A method of detection of the speed offset will now be described. In the case where there is no speed offset, a phase offset is applied so that the phase is shifted equally in positive and negative ($\pm$) directions around the maximum envelope point. Therefore, if the amount of phase offset in a predetermined period of time is integrated, the value of integration substantially converges to 0. However, in the case where there is a speed offset, the number of times of phase shift in a direction in which the speed offset is cancelled is increased. Therefore, if the amount of phase shift is integrated, the value of integration increases or decreases with the lapse of time. Accordingly, if a proper threshold value is provided and the judgement is made as to whether the value of integration exceeds the threshold value, it is possible to detect the presence/absence of a speed offset. Also, it is possible to know the direction of the speed offset from the polarity of the value of integration.

A relationship between the tracking control parameters and a detection time is as follows. Here, the definition of variables is such that $\Delta x$ is a phase offset (tracks), T is an increase/decrease detection period (seconds), $\Delta v$ is a speed offset or (recording tape speed)/(reproducing tape speed), and $f$ is a field frequency (Hz).

In the case of an uncontrolled condition, a tracking deviation $\Delta d$ generated in $t$ seconds due to the speed offset is represented by the following equation:

$$\Delta d = \Delta v \times f \times t \text{ (tracks)} \qquad (1)$$

In order to absorb the above tracking deviation by performing a tracking control, it is necessary to apply a phase offset corresponding to $\Delta d$. Provided that a difference between the number of times of phase offset on the positive (+) side and that on the negative (−) side is $n$ times, the following is satisfied:

$$\Delta d = n \times \Delta x \therefore n = \Delta d/\Delta x = \Delta v \times f \times t/\Delta x \qquad (2)$$

Provided that a threshold value of $n$ for making the judgement of a speed deviation as being present is $n_{th}$, the time $t$ required for detection is represented by the following:

$$t = (n_{th} \times \Delta x)/(\Delta v \times f) \qquad (3)$$

If the detection time $t$ is determined in accordance with the equation (3), it is possible to determine the amount of speed offset since the phase step amount and the detection threshold value are already known. Then, an offset may be added to a reference phase signal so that the determined speed offset is cancelled.

If the noise level of an envelope signal is sufficiently small so that the influence thereof on the detection of increase/decrease of the envelope level is negligible, the correction can be made at one time by use of the equation (3). However, in the case where errors occur in the detection of increase/decrease of the envelope level due to noise, it is not possible to uniquely determine a speed offset from the detection time. The influence of noise on the envelope signal can be reduced by gradual convergence through a feedback control of detecting only the presence/absence and the direction of a speed offset by use of a threshold value set with variations due to noise being taken into consideration, providing, in the case where the speed offset is detected, predetermined correction data irrespective of the magnitude of the speed offset, and carrying out the detection again. In this case, the time of convergence of correction may be shortened by making the phase offset amount $\Delta x$ small, as apparent from the equation (3). However, if the phase offset amount is made small, there is a problem that a tracking deviation or off-tracking is generated during detection since a speed offset range in which the pull-in is possible becomes narrow. Thus, the reduction of the overall convergence time and the prevention of off-tracking during control become possible with a construction in which correction for only the case of a speed offset larger than a predetermined value is first made with the amount of phase offset made large and a detection end limit time made short, and the phase offset amount and the limit time are successively made small and long, respectively, to ultimately provide convergence into a target speed offset range.

DESCRIPTION OF THE PREFERRED EMBODIMENTS

The details of the present invention will now be explained with reference to the embodiments shown in the accompanying drawings.

Figure 1:
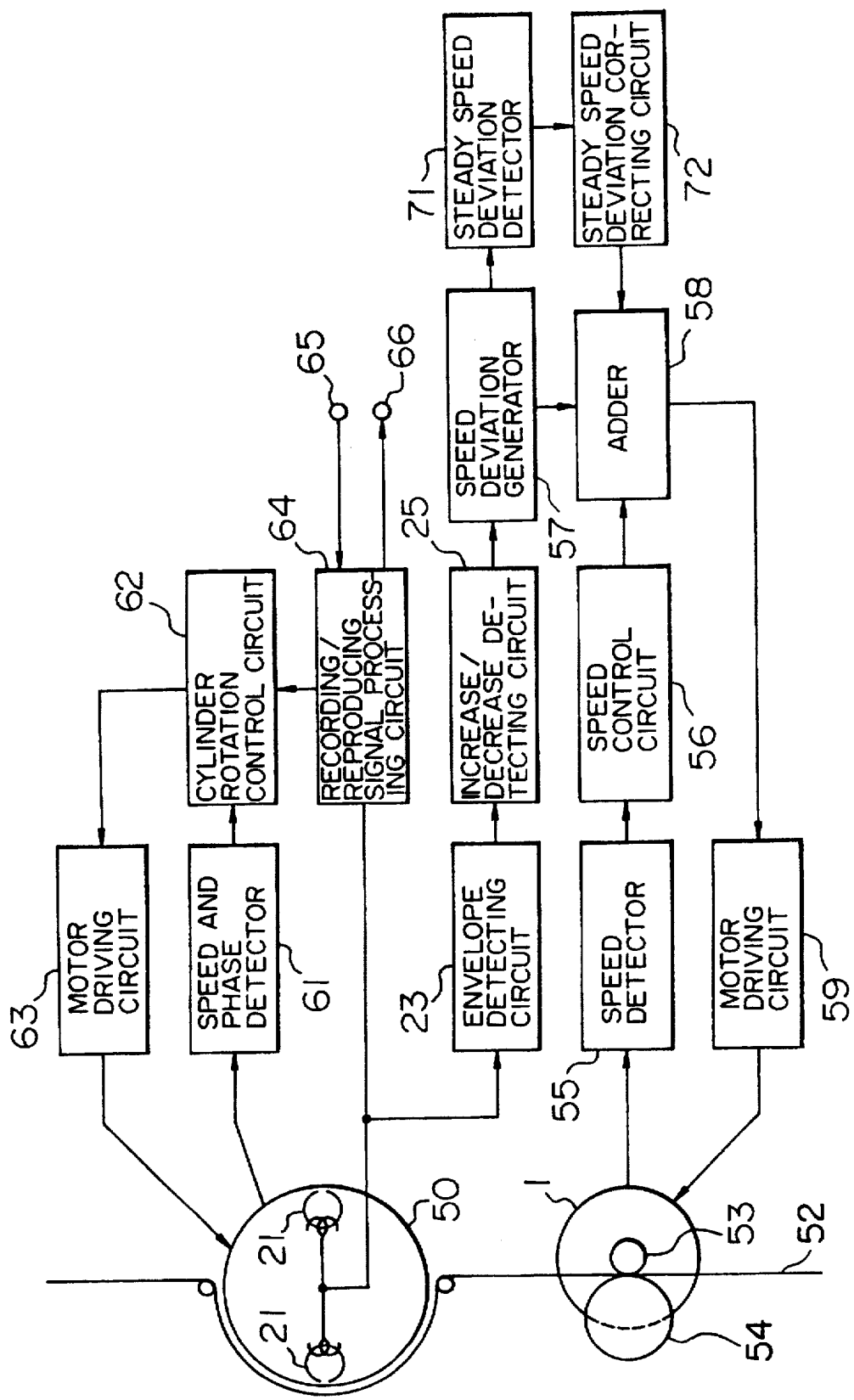
FIG. 1 is a block diagram of a tracking apparatus for a magnetic recording/reproducing system according to an embodiment of the present invention.

FIG. 1 is a block diagram of a tracking apparatus for a magnetic recording/reproducing system according to an embodiment of the present invention. In FIG. 1, reference numeral 50 denotes a rotating cylinder rotated by a cylinder motor (not shown). The rotating cylinder 50 is controlled through a motor driving circuit 63 by a cylinder rotation control circuit 62 on the basis of speed and phase information from a rotation speed and rotation phase detector 61 so that the rotating cylinder 50 rotates at a predetermined rotation speed and a predetermined rotation phase. A rotation phase control at the time of recording is performed so that a vertical synchronizing signal of a recording video signal inputted from a recording/reproducing signal processing circuit 64 and the rotation phase of the rotating cylinder 50 have a predetermined phase relationship therebetween. At the time of reproduction, a phase control based on a comparison of the rotation phase of the rotating cylinder 50 with a reference phase signal generated in the cylinder rotation control circuit 62 is performed.

The recording/reproducing signal processing circuit 64 performs processing of a recording signal and a reproduced signal. Numeral 65 denotes a signal input terminal, and numeral 66 denotes a signal output terminal. Recording onto a magnetic tape 52 obliquely wound on the rotating cylinder 50 and reproduction from the magnetic tape 52 are performed with opposing magnetic heads 21 mounted on the rotating cylinder 50 with an angle of 180° therebetween, with the corresponding processing being performed by the recording/reproducing signal processing circuit 64.

Numeral 1 denotes a capstan motor. The magnetic tape 52 is transported by rotating the capstan motor 1 with the magnetic tape 52 being sandwiched between a capstan 53 which is mounted on a rotation axis of the capstan motor 1 and a pinch roller 54 which freely rotates. At the time of recording, a speed control circuit 56 controls the rotation speed of the capstan motor 1 through a motor driving circuit 59 on the basis of rotation speed information from a speed detector 55 so that the rotation speed of the capstan motor 1 becomes a predetermined value. At the time of reproduction, there are used, in addition to such a control system, an envelope detecting circuit 23 for detecting the envelope of a reproduced signal from the magnetic heads 21, an increase/decrease detecting circuit 25 for detecting whether the level of an envelope signal from the envelope detecting circuit 23 has increased or decreased, a speed deviation generator 57 and an adder 58. A speed deviation signal for accelerating or decelerating the capstan motor 1 in a predetermined period of time to shift a rotation phase of the capstan motor 1 is generated by the speed deviation generator 57 and is added by the adder 58 to a rotation phase control signal from the speed control circuit 56. The increase/decrease detecting circuit 25 compares levels of the envelope signal from the envelope detecting circuit 23 before and after the speed deviation signal is added. A control is performed so that a speed deviation having the same direction is applied again in the case where the envelope signal level is increased and a speed deviation having the opposite direction is applied in the case where the envelope signal level is decreased. Thereby, an automatic tracking control is performed. Numeral 71 denotes a steady speed deviation detector for detecting a steady speed deviation between a recording apparatus and a reproducing apparatus on the basis of speed deviation information generated in the process of automatic tracking control. A correction signal is generated by a steady speed deviation correcting circuit 72 on the basis of detection information from the steady speed deviation detector 71 and is added by the adder 58 to the rotation phase control signal. With such a correction of the steady speed deviation, a speed deviation added in the automatic tracking control can be made sufficiently small, and hence the amount of meandering can be made small, thereby making it possible to perform a tracking control without deteriorating the image quality.

Figure 2:
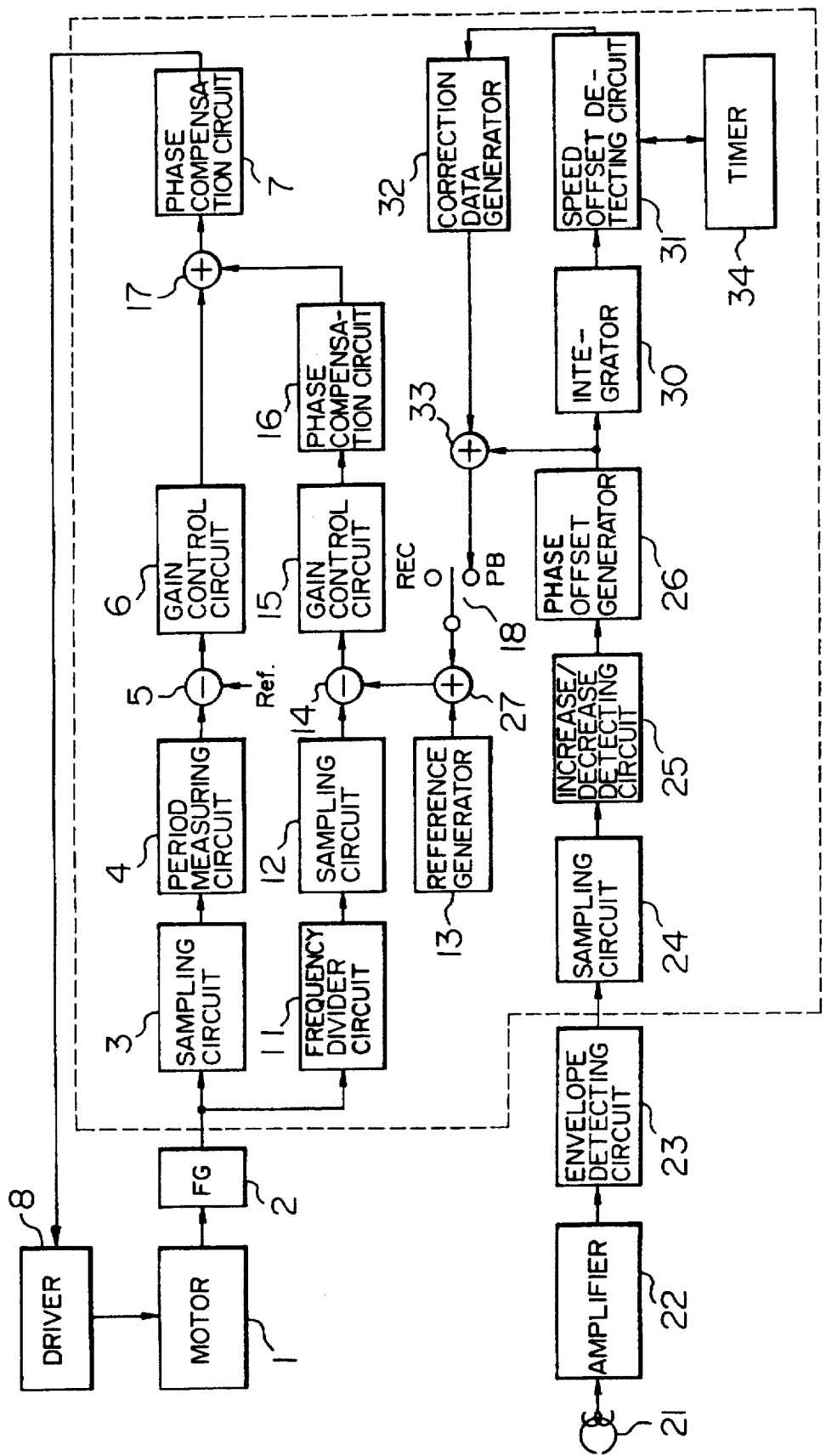
FIG. 2 is a block diagram of a capstan control system of a tracking apparatus according to an embodiment of the present invention.

An example of a more detailed construction for control of the rotation of the capstan motor will be explained with reference to FIG. 2. FIG. 2 is a block diagram of a capstan control section of a tracking apparatus according to an embodiment of the present invention. Since a construction other than the control section for the capstan motor 1 is the same as that shown in FIG. 1, it is omitted from the illustration. The magnetic tape is transported by rotating the capstan motor 1 with the magnetic tape being sandwiched between the capstan (not shown) mounted on the capstan motor 1 (hereinafter abbreviated to motor) and the freely rotating pinch roller (not shown). A control of rotation of the motor 1 includes a speed control for rotating the motor 1 at a target rotation speed and a phase control for rotating the motor 1 at a predetermined phase.

In a speed control system, an FG pulse signal having a frequency proportional to the speed of rotation of the motor 1 is generated by a frequency generator (FG) 2 attached to the motor 1 and is then sampled by a sampling circuit 3. The period of the sampled pulses is determined by a period measuring circuit 4. A subtracter 5 determines a difference between the determined period and a target period (shown as Ref. in FIG. 2), and outputs the difference as a speed error signal. This speed error signal is processed by a gain control circuit 6 and a phase compensation circuit 7 and is then inputted as a motor control signal to a motor driver circuit 8 to drive the motor 1, thereby performing a feedback control.

A phase control system uses the FG pulse signal in the same way as the speed control system. However, since a control band of the phase control system is generally lower than that of the speed control system, the FG pulse signal is divided by a frequency divider circuit 11 in order to lower its frequency. The frequency-divided FG pulse signal is sampled by a sampling circuit 12. A subtracter 14 determines a difference in phase between an output signal of the sampling circuit 12 and a reference phase signal generated by a reference phase signal generator 13. The reference phase signal is generated by successively adding a time corresponding to the period of FG pulses (1/m in the case of division by m) to a time corresponding to the period of preceding FG pulses. A phase error signal produced by the subtracter 14 is processed by a gain control circuit 15 and a phase compensation circuit 16 and is then added by an adder 17 to the above-mentioned speed error signal.

At the time of recording, the rotation of the motor 1 is controlled through the above processing. At the time of reproduction, the following control is added in order to perform a tracking control. Namely, a video signal reproduced by the magnetic head 21 (only one shown) mounted on the rotating cylinder (not shown) is amplified by an amplifier 22 and an envelope signal is generated by an envelope detecting circuit 23. The envelope signal is sampled by a sampling circuit 24 at a timing synchronous with the phase of the rotating cylinder and is then inputted to an increase/decrease detecting circuit 25. The increase/decrease detecting circuit 25 holds envelope signals in predetermined periods of time before and after an offset is applied to the rotation phase of the motor 1 as described below and compares the levels of the two envelope signals to judge whether the envelope signal level has increased or decreased. The result of the judgement is inputted to a phase offset generator 26 which in turn generates a predetermined phase offset signal in accordance with the result of the judgement. The phase offset signal is added by an adder 27 to the reference phase signal. The generation of the phase offset signal is such that an offset having the same polarity as the previously generated offset is generated in the case where the result of the judgement by the increase/decrease detecting circuit 25 indicates that the envelope signal level has increased and an offset having a polarity opposite to the previously generated offset is generated in the case where the result of the judgement by the increase/decrease detecting circuit 25 indicates that the envelope signal level has decreased. With the above construction, an automatic tracking control is performed. Numeral 18 denotes a switch which is changed over between the time of recording (REC) and the time of reproduction (PB) to turn off and on the addition of the phase offset signal.

Next, a control for correction of the speed offset will be explained. The phase offset signal generated by the phase offset generator 26 is inputted to an integrator 30 and is integrated thereby for a predetermined period of time. A speed offset detecting circuit 31 compares the value of integration with a preset threshold value. In the case where the value of integration exceeds the threshold value, a time elapsed when the value of integration exceeds the threshold value and the polarity of the value of integration (i.e., whether the value is positive or negative) are supplied from the speed offset detecting circuit 31 to a correction data generator 32. The correction data generator 32 generates an offset signal having a polarity and a value effective for correction of the speed offset in accordance with the detection information from the speed offset detecting circuit 31. The generated offset signal is added by an adder 33 to the phase offset signal for automatic tracking control. In the case where the value of integration does not exceed the threshold value when the predetermined period of time has elapsed, the value of integration is cleared to start the detection again. The correction data generator 32 holds the preceding offset signal so long as data from the speed offset detecting circuit 31 does not change. Numeral 34 denotes a timer which is used for the measurement of the time elapsed when the value of integration exceeds the threshold value and as a limiter for the detection time.

Figure 3:
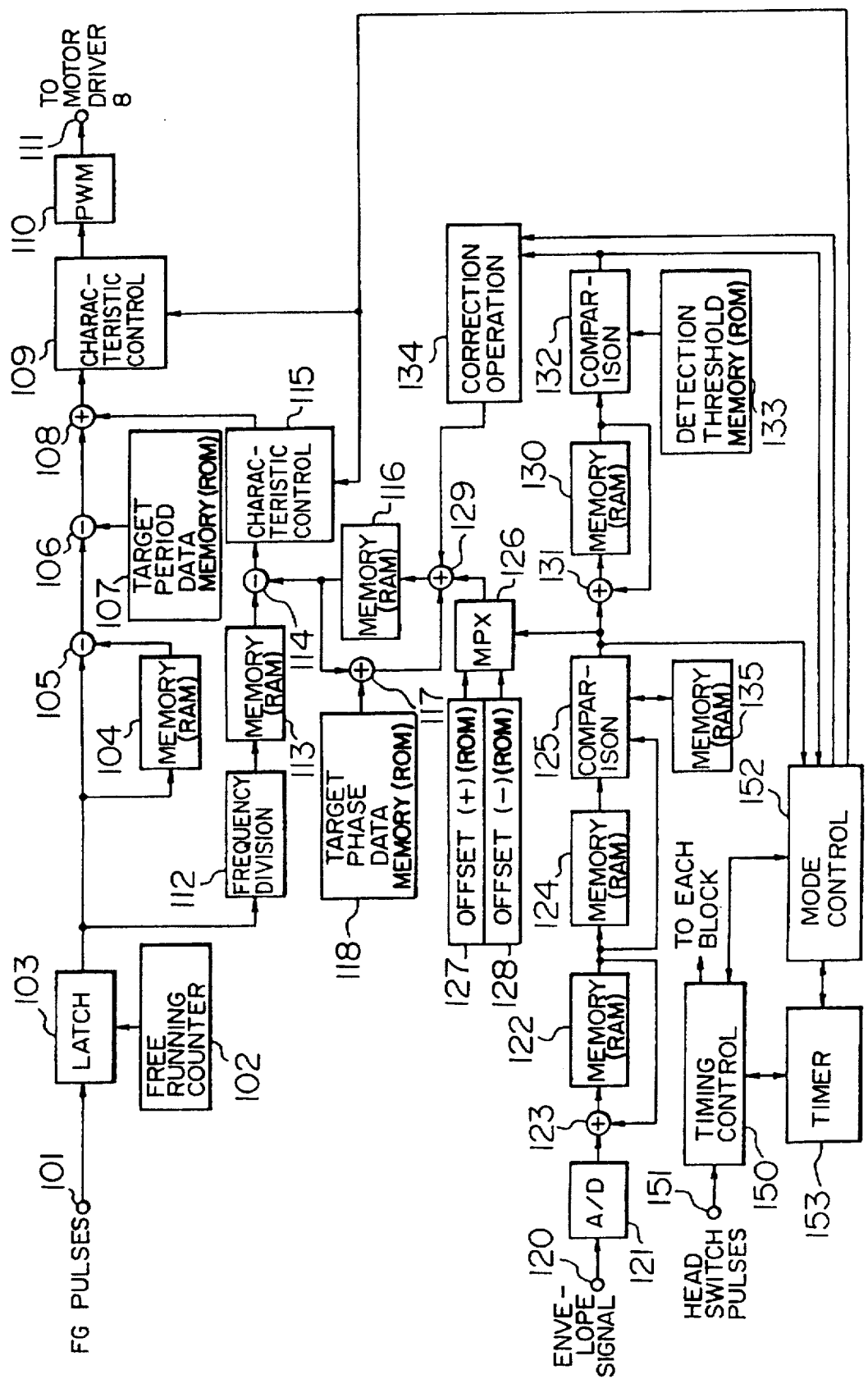
FIG. 3 is a block diagram of a capstan control system of a tracking apparatus according to an embodiment of the present invention.

The above control can be realized by any one of an analog circuit, a digital circuit and an operational processing using a microcomputer. One example in which a portion enclosed by the dashed line in FIG. 2 is implemented by a microcomputer will be explained as an embodiment of the present invention with reference to FIG. 3. FIG. 3 represents the operational processing by a block diagram. The processing functions are realized using the operational functions of the microcomputer, memories (RAM and ROM) and hardware for signal input/output. In the following explanation, each processing function block in FIG. 3 will be referred to as a processing circuit for the sake of convenience.

The change-over of various parameters including the step amount $\Delta x$, the increase/decrease detection period T, and the control characteristic such as the gain of the phase control system is performed by a mode control processing circuit 152. Comparison data output from a comparison processing circuit 125 (corresponding to an output of increase/decrease detecting circuit 25 in FIG. 2) and comparison data output from a comparison processing circuit 132 (corresponding to an output of speed offset detecting circuit 31 in FIG. 2) are inputted to the mode control processing circuit 152 and the data setting mode for the above parameters is changed over in accordance with the inputted comparison data. Mode information from the mode control processing circuit 152 is inputted to a timing control processing circuit 150, characteristic control processing circuits 109 and 115, a correction operation processing circuit 134 and so forth, and each processing circuit changes over its parameter or parameters in accordance with the mode information. The specific change-over control of each processing circuit will be clarified in the following explanation of the operation of the present embodiment.

In a speed control, count data of a free running counter processing circuit 102 is latched by a latch processing circuit 103 in accordance with FG pulses inputted to an input terminal 101, and a subtraction processing circuit 105 obtains a difference between the latch data of the latch processing circuit 103 and preceding latch data held in a memory (RAM) 104 to measure the period of the FG pulses. A subtraction processing circuit 106 obtains a difference between the measured period and target period data to generate a speed error signal. The target period data is stored in a target period data memory (ROM) 107. The speed error signal is subjected to a processing for gain control and phase compensation by the characteristic control processing circuit 109 and is then outputted through a pulse width modulation (PWM) processing circuit 110 to the motor driver 8 from an output terminal 111.

In a phase control, the latch data of the latch processing circuit 103 is stored into a memory (RAM) 113 by a frequency division processing circuit 112 after every n FG pulses to obtain phase timing data corresponding to frequency-divided FG pulses. A subtraction processing circuit 114 obtains a difference between the phase timing data and reference phase data to generate a phase error signal. The reference phase data is stored in a memory (RAM) 116. The phase error signal is subjected to a processing for gain control and phase compensation by the characteristic control processing circuit 115 and is then added by an addition processing circuit 108 to the above-mentioned speed error signal. Target phase data stored in a target phase data memory (ROM) 118 is added by an addition processing circuit 117 to the reference phase data output from the memory (RAM) 116. The result of the addition is stored into the memory (RAM) 116, thereby updating the reference phase data to generate the next reference phase data. The updating of the reference phase data is made at the point of time when the phase comparison processing by the subtraction processing circuit 114 is completed. Numeral 129 denotes an addition processing circuit for addition of phase offset data for tracking control which will be described later on. The function of addition processing of the addition processing circuit 129 is stopped at the time of recording.

Next, the tracking control will be explained. An envelope signal inputted to an input terminal 120 is sampled by an A/D converter processing circuit 121. The envelope signal is sampled $k$ times for each field. The sampling data is integrated and averaged by an integration processing function section formed by a memory (RAM) 122 and an addition processing circuit 123 to reduce the influence of noise on the envelope signal. The period of time of integration is the increase/decrease detection time T. After the sampling data has been integrated for the period of time T, the value of integration is compared by a comparison processing circuit 125 with the value of integration in the preceding integration period of time stored in a memory (RAM) 124 to judge the increase/decrease in envelope signal level. After the comparison processing, the value of integration stored in the memory (RAM) 124 is updated with the present value of integration. Numeral 135 denotes a memory (RAM) for storing the polarity of a phase offset. The RAM 135 stores "+1" when a phase offset having a positive (+) direction is generated and "–1" when a phase offset having a negative (−) direction is generated. In the case where the result of the comparison processing indicates an increase in the envelope signal level, the comparison processing circuit 125 outputs the data of the RAM 135 to a switch (MPX) 126 as it is. In the case where the result of the comparison processing indicates a decrease in the envelope signal level, the comparison processing circuit 125 outputs a sign-inverted value of the data of the RAM 135 to the switch (MPX) 126 and updates the data of the RAM 135. Phase offset data stored in one of ROMs 127 (+) or 128 (−) is selected by the switch (MPX) 126 in accordance with the output data of the comparison processing circuit 125 and is then added by the addition processing circuit 129 to the reference phase data which is then stored in the memory (RAM) 116. The addition of the phase offset data is performed only one time in the detection period and the offset is not applied after the reference phase data stored in the memory (RAM) 116 is updated. With the above processing, the increase in envelope signal level after the application of the phase offset is followed by the application of a phase offset of the same direction and the decrease in envelope signal level is followed by the application of a phase offset of a reverse direction, thereby realizing an automatic tracking control.

Next, a speed offset correction processing will be explained. The output of the comparison processing circuit 125 is inputted to an integration processing function section including a memory (RAM) 130 and an addition processing circuit 131 and is integrated thereby. Integration of the phase offset signal or data was discussed in the explanation of the embodiment shown in FIG. 2. However, since the phase offset data is constant or fixed, it is enough to count the number of times of application of the phase offset in the positive (+) direction and the number of times of application of the phase offset in the negative (−) direction. In the present embodiment, "+1" outputted from the comparison processing circuit 125 in the case of generation of the phase offset of the positive (+) direction and "−1" outputted therefrom in the case of generation of the phase offset of the negative (−) direction may be integrated. The value of integration is inputted to a comparison processing circuit 132 for comparison with a detection threshold value stored in a detection threshold memory (ROM) 133. In the case where the value of integration exceeds the detection threshold value, a polarity of the value of integration at that time is inputted to a correction operation processing circuit 134. Numeral 153 denotes a timer processing circuit. On the basis of a signal inputted from the comparison processing circuit 132 through the mode control processing circuit 152, the timer processing circuit 153 measures a time elapsed when the value of integration exceeds the detection threshold value. The measured time is outputted to the correction operation processing circuit 134 through the mode control processing circuit 152. The correction operation processing circuit 134 calculates the amount of speed offset in accordance with the above-mentioned equation (3) and generates phase offset data for correction of the speed offset. The phase offset data is added by the addition processing circuit 129 to the reference phase data which is then stored in the memory (RAM) 116. With the above processing, it is possible to correct a deviation in tape transport speed between a recording apparatus and a reproducing apparatus.

The timing control processing circuit 150 is a processing function block for performing a timing control for various memories, operation, A/D conversion, the setting of the increase/decrease detection period, and so forth. Numeral 151 denotes an input terminal to which is inputted a signal synchronous with the rotation phase of the rotating cylinder 50 (not shown), for example, head switch pulses. The timing control processing circuit 150 counts the number of fields by use of the signal inputted from the input terminal 151 to perform the control of the detection period and the control of A/D conversion. The mode control processing circuit 152 is a processing function block for controlling the setting of coefficients of various operation processings and the change-over of modes.

Figure 4:
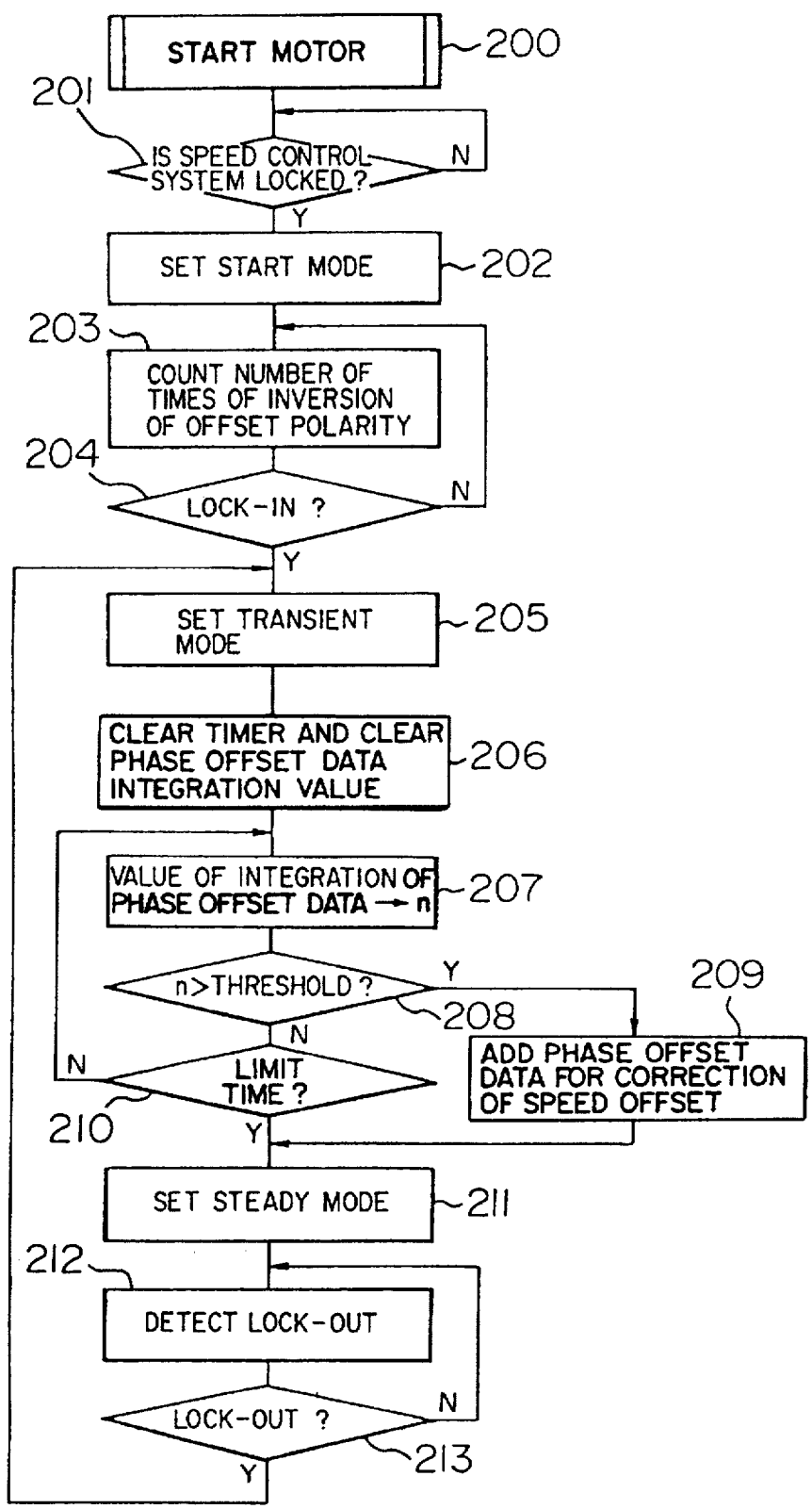
FIG. 4 is a flow chart showing an example of a control processing flow in the embodiment shown in FIG. 3.

Next, a transient control using the construction of the present embodiment will be explained using a flow chart shown in FIG. 4. When a speed control system is locked (step 201) after the start of the motor 1 (step 200), parameters of a start mode are set to start a tracking control (step 202). At this time, the setting is made with the highest preference given to the reduction of a pull-in time such that the amount of phase offset is large, an increase/decrease detection period is short and the gain of a phase control system is high. In the case of off-tracking, a phase offset in the negative (−) direction is applied having the maximum point as a target. If a correct tracking is attained going over the maximum point, the phase offset will be applied in both the positive (+) and negative (−) directions. This is utilized to determine lock-in when the number of times of change in the direction of phase offset reaches a predetermined value (steps 203 and 204). In the case where the lock-in is determined, the flow goes to a transient mode in which the detection of a speed offset is made (step 205). Parameters of the transient mode are set in accordance with the above-mentioned equation (3) and considering the range of a speed offset to be detected. Now provided that the speed offset detection limit Δv is 0.1%, the threshold value $n_{th}$ is 3, the amount of phase offset Δx is 0.1 tracks, and the field frequency $f$ is 60 Hz, a limit time $t$ for the end of detection is about 5 seconds. Also, since the detection time does not depend on the gain of the phase control system and the detection period, as apparent from the equation (3), the gain is lowered so as to be the same as that at the time of recording and the detection period is increased in order to reduce the influence of noise on the envelope signal.

After the parameters of the transient mode have been set, the timer for detection of a speed offset and the value of integration of the phase offset data are cleared (step 206) to start the detection of a speed offset (steps 207 to 210). When the value of integration exceeds the threshold value within the limit time, phase offset data is added to the reference phase data to correct the speed offset (step 209). If the value of integration does not exceed the threshold value within the limit time, the speed offset is judged as being below the detection limit and the flow goes to a steady mode (step 211). The setting in the steady mode is made with the highest preference given to the image quality such that the amount of phase offset is small and the detection period is long. In the steady mode, the processing for speed offset detection is continued (steps 212 and 213). If a speed offset is detected, a control operation to go to the transient mode is performed and the flow returns to step 205.

Figure 5:
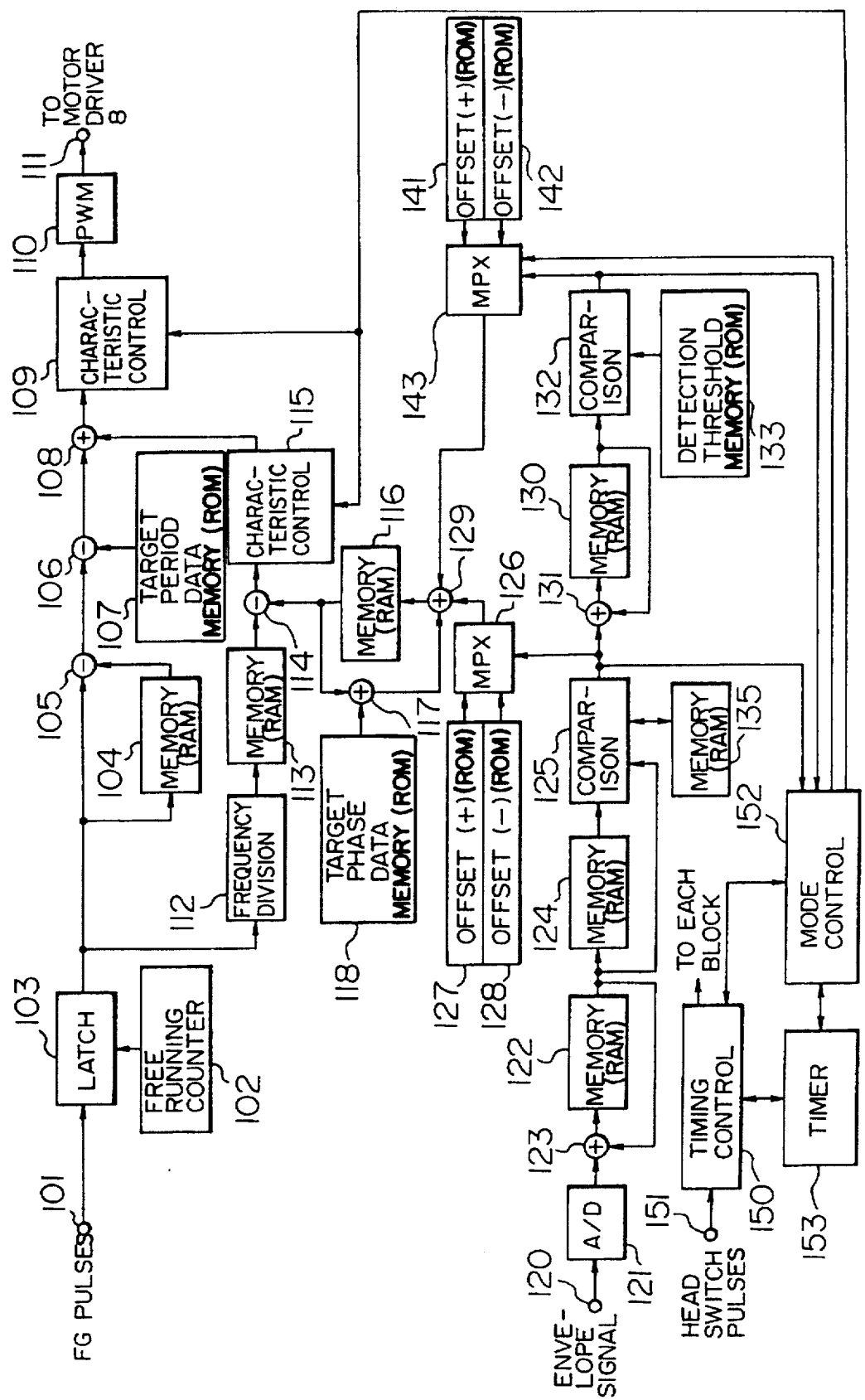
FIG. 5 is a block diagram of a capstan control system of a tracking apparatus according to an embodiment of the present invention.

Next, a further embodiment of the present invention will be described. In the present embodiment, a processing for preventing erroneous detection caused by the influence of noise on the envelope signal is added to the processing for detection of speed offset. If the level of noise is negligible, no erroneous detection is generated in the detection of increase/decrease of an envelope signal level and a time change in the value of integration of the phase offset data follows the equation (3). However, in the case where the influence of noise is not negligible with the possibility of erroneous detection in the detection of increase/decrease, it is not possible to uniquely determine the amount of speed offset in the detection time. Therefore, in the present embodiment, convergence is attained by performing a repeated processing in which only the presence/absence and the polarity of a speed offset are detected and predetermined phase offset data is added to reference phase data. An example of the construction of the present embodiment is shown in FIG. 5. Phase offset data is stored in ROMs 141 (+) and 142 (−). The value of the phase offset data may be changed in accordance with a mode to be described later. Numeral 143 denotes a switch (MPX) which selects the phase offset data stored in one of ROMs 141 and 142 in accordance with information of the presence/absence and the polarity of a speed offset from the comparison processing circuit 132 so that the selected phase offset data is added to the reference phase data. Since the construction of other portions in FIG. 5 is the same as that in FIG. 3, explanation thereof will be omitted.

Figure 6:
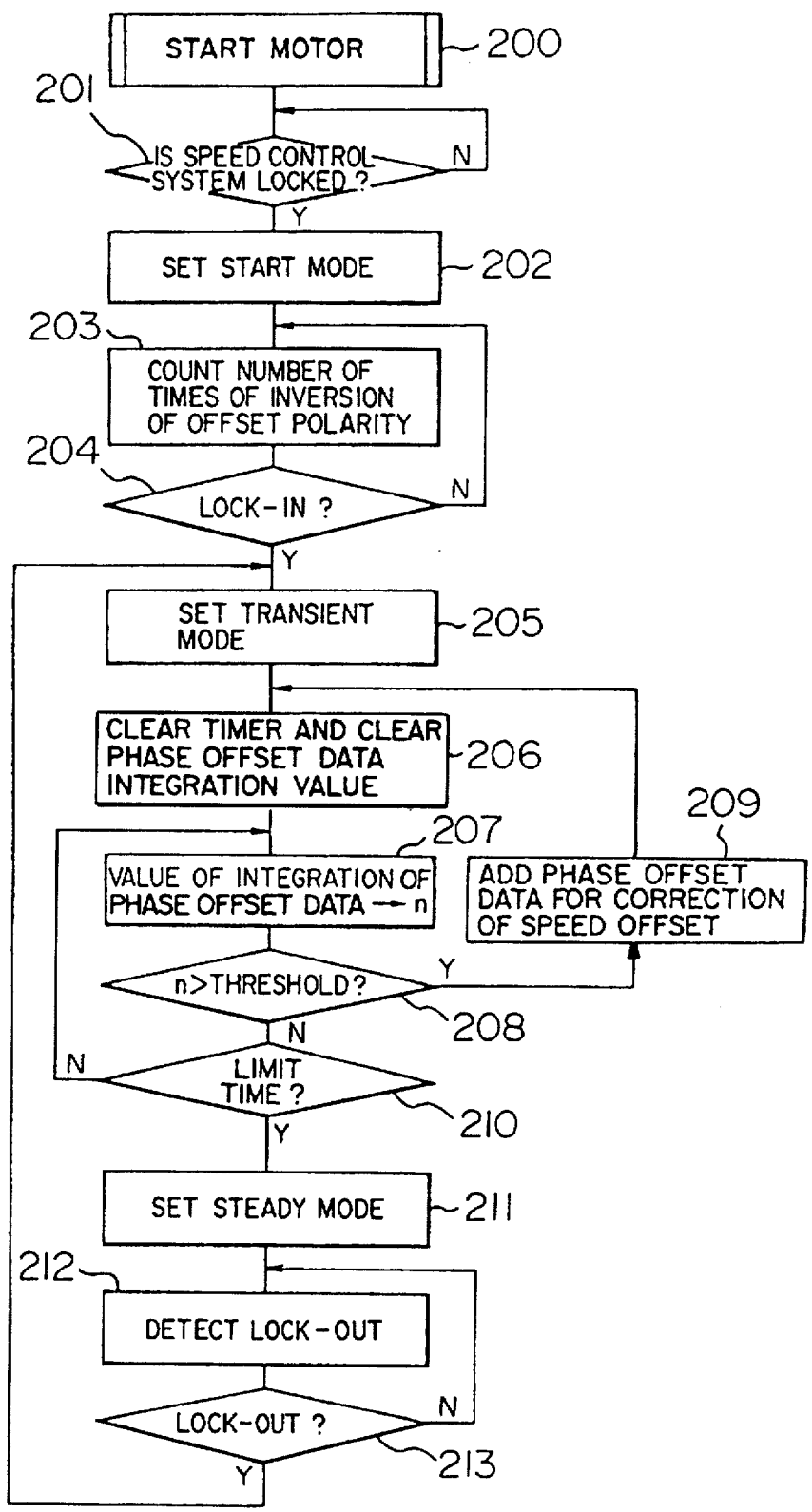
FIG. 6 is a flow chart showing an example of a control processing flow in the embodiment shown in FIG. 5.

An example of a transient control using the construction of the present embodiment will be explained using a flow chart shown in FIG. 6. The flow chart shown in FIG. 6 is basically the same as that shown in FIG. 4. However, in the present embodiment, the detection of a speed offset is carried out again (the flow returns to steps 206 and 207) after the addition of phase offset data for correction of the speed offset (after step 209), and the detection and correction are repeated until the speed offset becomes below the detection limit and the limit time lapses (until the judgement in step 208 becomes negative and the judgement in step 210 becomes affirmative). Now assume that the amount of phase offset data for correction of the speed offset is set to a value corresponding to 0.1%. In this case, the speed offset is reduced by 0.1% for one correction processing. Therefore, for example, if there is the speed offset of 0.5%, the correction processing will be repeated five times.

Figure 7:
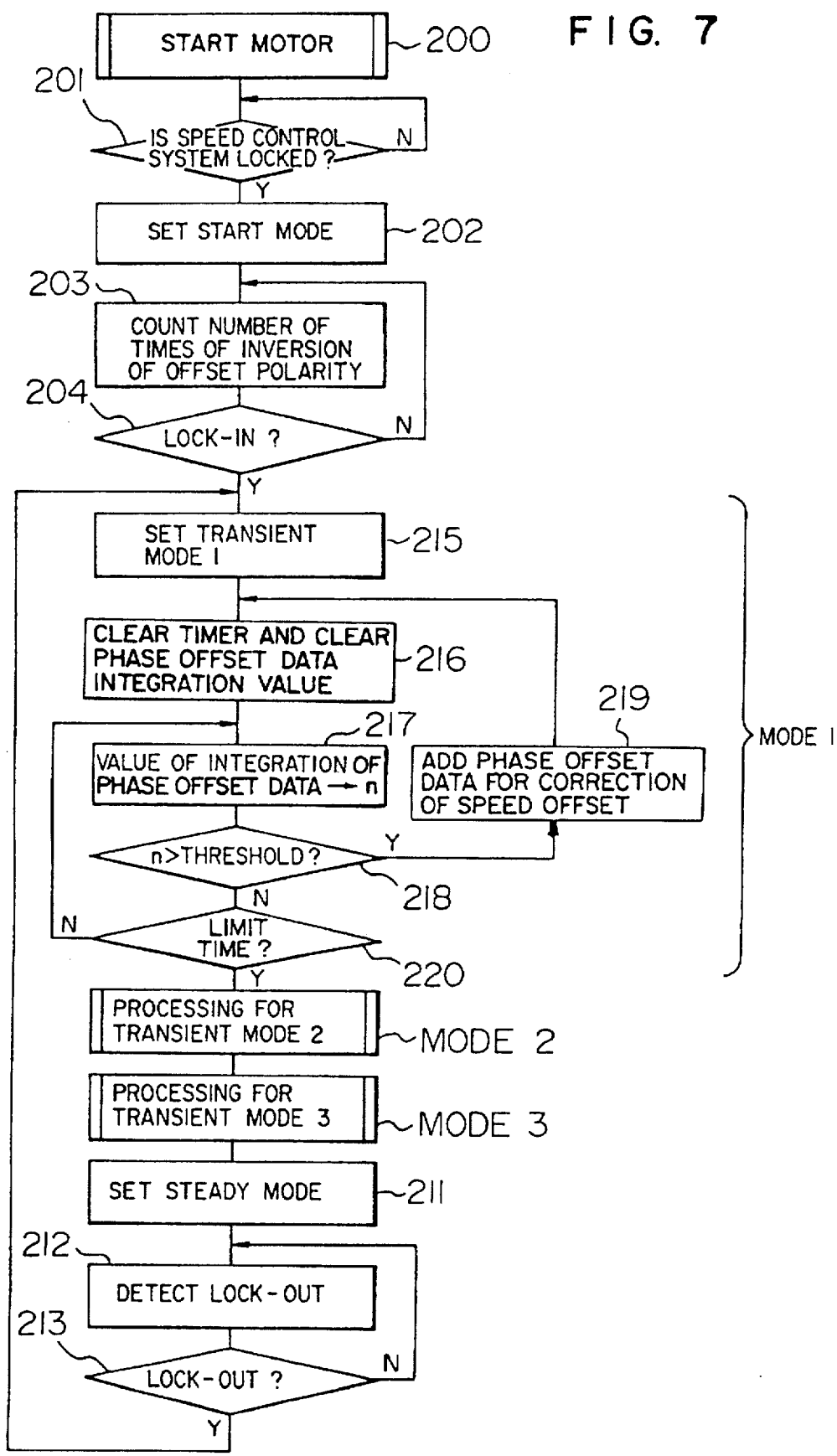
FIG. 7 is a flow chart showing an example of a control processing flow in an embodiment of the present invention.

Next, a still further embodiment of the present invention will be explained. The construction of the present embodiment is basically the same as that in the embodiment explained in conjunction with FIG. 5. However, in the present embodiment, a time required for the detection of a speed offset is shortened by changing a control flow. As apparent from the equation (3), the detection time is shorter as the speed offset is larger and as the amount of phase offset is smaller. This is utilized in the present embodiment to provide a construction in which a plurality of modes for speed offset detection are provided and parameters for speed offset detection are successively changed so as to successively perform processing in each of these modes. An example of a control flow in the present embodiment is shown in FIG. 7. In this control flow, three transient modes 1, 2 and 3 (three modes each of which performs steps 215 to 220 corresponding to steps 205 to 210 shown in FIG. 6) are provided so that in the order of modes 1, 2 and 3, the phase offset amount is decreased, the detection time limit is increased, the speed offset correction amount is decreased and the detection threshold value is increased. Thereby, it becomes possible to perform precise correction while gradually increasing the precision of detection without increasing the detection time unnecessarily.

Figure 8:
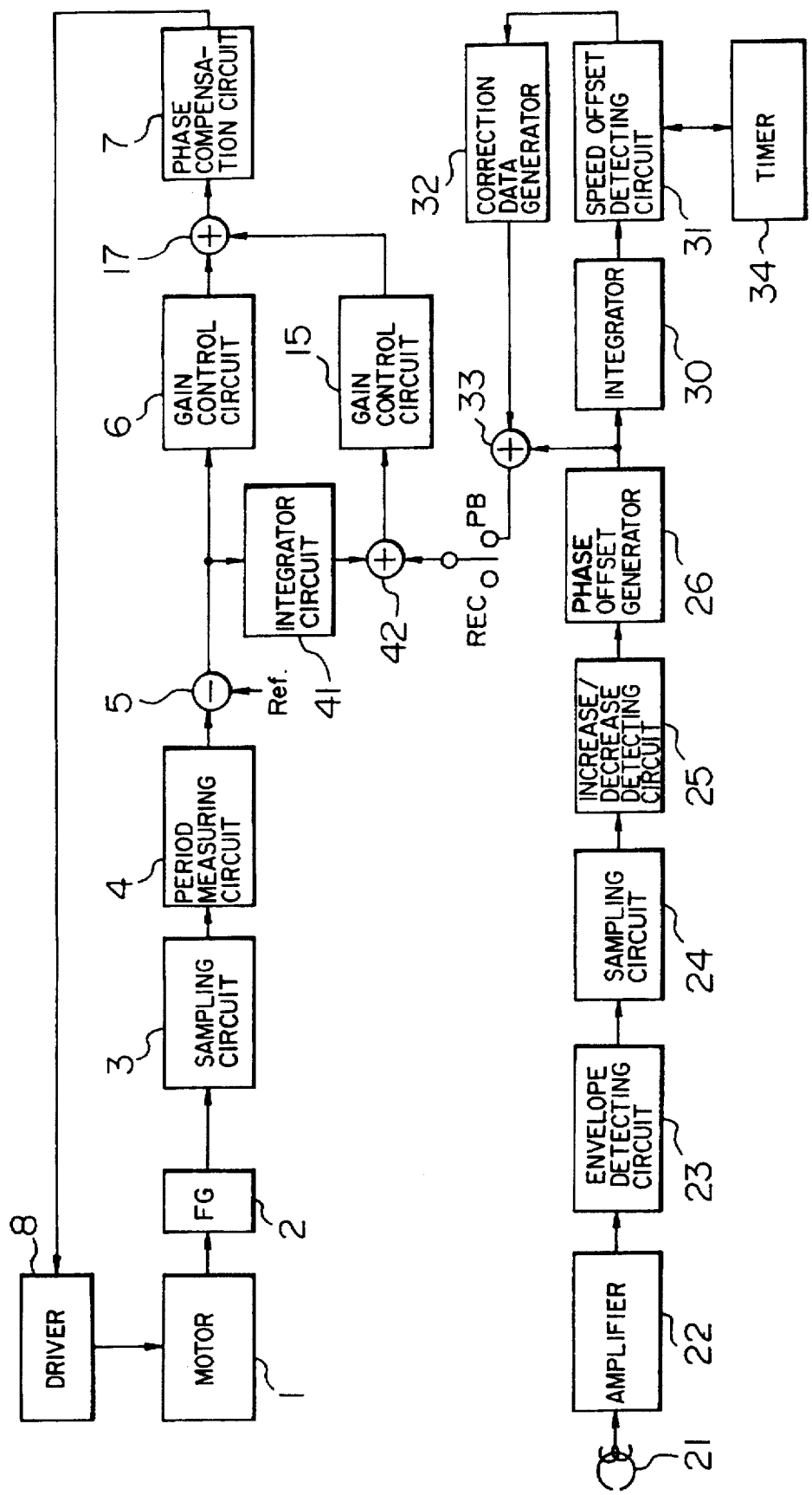
FIG. 8 is a block diagram of a capstan control system of a tracking apparatus according to an embodiment of the present invention.
Figure 9:
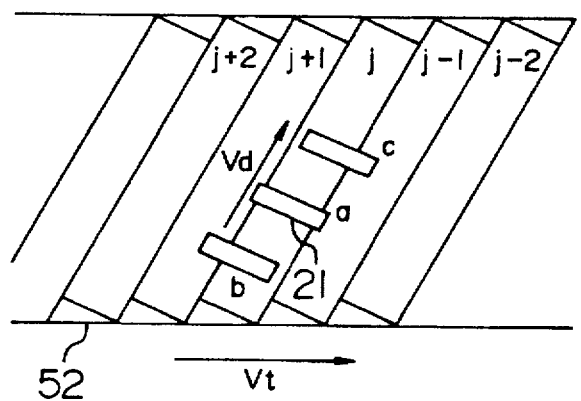
FIG. 9 is a diagram for explaining the outline of a tracking control in a VTR.
Figure 10A:
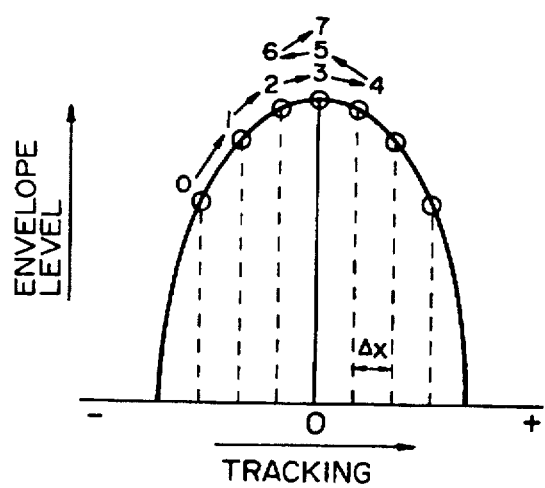
FIGS. 10A and 10B are explanatory diagrams schematically showing the operation of an automatic tracking control.
Figure 10B:
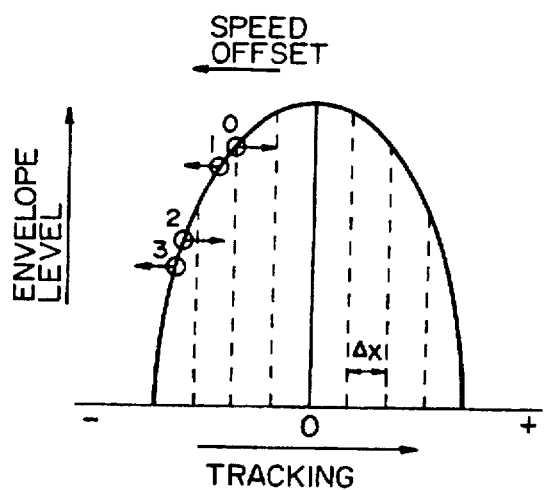

Though the foregoing explanation has been made in conjunction with the case where the phase control is based on a phase comparing system, the present invention is not limited to such a case. Other constructions can be employed so long as a similar effect is obtained. An example of such a construction as a further embodiment of the present invention is shown in FIG. 8. In a phase control system of the present embodiment, a speed error signal generated in a speed control system is integrated and control is performed so that the value of integration becomes 0. Reference numeral 41 denotes an integrator circuit which integrates a speed error signal output from a subtracter 5. In the present embodiment, too, the transient response and the precision of image quality in an automatic tracking control are consistent with each other. With respect to correction for a speed offset, the same effect as that in the phase comparing system in each of the foregoing embodiments is provided by adding phase offset data for speed offset correction to the value of integration from integrator circuit 41 with an adder 42. Since the construction of the other portions in FIG. 8 is similar to that in FIG. 2, the explanation thereof will be omitted.

According to the present invention as has been described above, a tracking control can be realized by the use of only an automatic tracking control using an envelope signal of a reproduced video signal. Therefore, a dedicated signal for tracking becomes unnecessary, thereby enabling the reduction in number of parts and hence the reduction in cost. Also, with the construction enabling change-over between a plurality of modes, it is possible to shorten a transient response time and to suppress the deterioration of an image quality in a steady state. Further, with the provision of speed offset correcting means, the reproduction from a tape subjected to recording by use of a different recording apparatus can also be made with no deterioration of an image quality.

We claim:

1. A tracking apparatus used in a helical scan magnetic recording/reproducing system, comprising means for controlling the rotation speed of a capstan motor which transports a magnetic tape, means for applying a deviation to the rotation speed, envelope level detecting means for detecting the envelope level of a reproduced signal, means for storing the value of detection by said envelope level detecting means, and means for comparing envelope levels before and after the deviation is applied to the rotation speed, whereby the rotation of the capstan motor is controlled so that the envelope level becomes a value in the vicinity of the maximum value, and further comprising means for detecting a steady speed deviation between a recording apparatus and a reproducing apparatus, and means for correcting the detected speed deviation, wherein said means for detecting a steady speed deviation between a recording apparatus and a reproducing apparatus is responsive to an output of said means for applying a deviation to the rotation speed.

2. A tracking apparatus for use in a helical scan magnetic reproducing or recording/reproducing system, the magnetic reproducing or recording/reproducing system including a capstan motor for transporting a magnetic tape, the magnetic tape having tracks recorded thereon, and a reproducing apparatus for helically scanning the magnetic tape and reproducing a signal from the tracks on the magnetic tape, thereby producing a reproduced signal having an envelope, the tracking apparatus comprising:

a rotation speed controller for controlling a rotation speed of the capstan motor, thereby controlling a speed at which the capstan motor transports the magnetic tape;

a speed deviation generator for applying a speed deviation to the rotation speed of the capstan motor;

an envelope level detector for detecting a level of the envelope of the reproduced signal before the speed deviation is applied to the rotation speed of the capstan motor, and a level of the envelope of the reproduced signal after the speed deviation is applied to the rotation speed of the capstan motor; and an envelope level comparator for comparing the level of the envelope of the reproduced signal detected before the speed deviation is applied to the rotation speed of the capstan motor with the level of the envelope of the reproduced signal detected after the speed deviation is applied to the rotation speed of the capstan motor, and producing an output indicating whether the level of the envelope of the reproduced signal has increased or decreased after the speed deviation is applied to the rotation speed of the capstan motor;

wherein the speed deviation generator generates the speed deviation based on the output of the envelope level comparator such that the level of the envelope of the reproduced signal increases until it is in a vicinity of a maximum value of the level of the envelope of the reproduced signal;

the tracking apparatus further comprising:

a steady speed deviation detector for detecting a steady speed deviation between a steady speed at which the magnetic tape is being transported by the capstan motor and a steady speed at which the magnetic tape was transported when the tracks were recorded on the magnetic tape; and a steady speed deviation corrector for applying a steady speed deviation correction to the steady speed deviation;

wherein the steady speed deviation detector detects the steady speed deviation based on the speed deviation generated by the speed deviation generator or the output of the envelope level comparator.

* * * * *